United States Patent [19]

Kim

[11] Patent Number: 5,748,597
[45] Date of Patent: May 5, 1998

[54] MULTI-LAYERED DISK FOCUSING METHOD AND APPARATUS

[75] Inventor: Nak-Seok Kim, Suwon, Rep. of Korea

[73] Assignee: Samsung Electronics Co., Ltd., Kyungki-do, Rep. of Korea

[21] Appl. No.: 719,702

[22] Filed: Sep. 27, 1996

[30] Foreign Application Priority Data

Sep. 30, 1995 [KR] Rep. of Korea ............... 33225/1995

[51] Int. Cl.$^6$ ................................................ G11B 3/74
[52] U.S. Cl. ................................................ 369/94
[58] Field of Search ........................... 369/275.3, 94, 369/112, 44.35, 44.25, 275.1

[56] References Cited

U.S. PATENT DOCUMENTS

| | | | |
|---|---|---|---|
| 5,251,198 | 10/1993 | Strickler | 369/94 |
| 5,263,011 | 11/1993 | Maeda et al. | 369/94 |
| 5,303,225 | 4/1994 | Satoh et al. | 369/275.3 |
| 5,381,401 | 1/1995 | Best et al. | 369/275.3 |
| 5,408,453 | 4/1995 | Holtslag et al. | 369/94 |
| 5,446,565 | 8/1995 | Kumma et al. | 369/94 |
| 5,499,231 | 3/1996 | Fennema et al. | 369/94 |
| 5,608,715 | 3/1997 | Yokogawa et al. | 369/94 |
| 5,625,609 | 4/1997 | Latta et al. | 369/94 |

*Primary Examiner*—Nabil Hindi
*Attorney, Agent, or Firm*—Sughrue, Mion, Zinn, Macpeak & Seas, PLLC

[57] ABSTRACT

A method and apparatus for focusing on a multi-layered disk is disclosed. The arrangement operates so that when it is determined to focus on the first layer, the focus actuator voltage is rapidly decreased to first bring down the objective lens, then the focus actuator voltage is slowly increased to bring the objective lens up, and focus on the first layer is achieved according to the detection status of a focus error signal; when it is determined to focus on the second layer, the focus actuator voltage is rapidly increased to bring up the objective lens, then the focus actuator voltage is slowly decreased to lower the objective lens, and focusing on the second layer is achieved according to the detection status of a focus error signal.

5 Claims, 5 Drawing Sheets

MULTI-LAYERED DISK FOCUSING METHOD AND APPARATUS

BACKGROUND OF THE INVENTION

1. Field of the Invention

This invention relates to a focusing method and apparatus for a multi-layered disk, and in particular to a method and apparatus which focuses on a multi-layered disk and maintains the same focusing speed and reliability for each layer.

The present application for the focusing method and apparatus is based on Korean Application No. 33225/1995 which is incorporated herein by reference for all purposes.

2. Description of the Related Art

Currently many efforts are underway to increase the data storing capacity of disks. One way of increasing disk storage capacity which is currently commercially available is to provide a double information layer.

FIG. 1 shows the construction of a device which reads information stored in a semi-transparent information layer and an opaque information layer of a multi-layered disk. The control unit 1 controls the servo and the disk device. The pick-up unit 2 extracts data optically from the double layered disk 8, and also contains an actuator for focusing and tracking. The RF amplifier unit 5 converts an optical signal into an electrical signal, and extracts EFM data and a servo signal for servo control. The digital signal processing unit 6 demodulates the EFM data, and generates table-of-contents (TOC) data, audio data, and a constant-linear-velocity (CLV) control signal. The servo signal processing unit 3 generates a servo-control signal for a stable servo-control after receiving a servo-signal from the RF amplifier unit and the digital signal processing unit. The spindle motor 7 receives the servo-control signal from the servo-signal processing unit 3, and then CLV controls the disk 8. The feeding unit 4 transports the pick-up.

FIG. 2 illustrates a focusing principle for a disk having double information layers: Numeral 2a refers to a semi-transparent first layer; numeral 2b refers to a separation layer; numeral 2c refers to an opaque second layer; numeral 2d refers to a transparent layer. In FIG. 2 cases A and B illustrate focusing on each layer of the disk.

FIG. 3 shows a pattern of focus error in a focus search. It is noted that there are two S-curves in FIG. 3, while there would be only one S-curve shown for a single layered disk. Reference character A indicates the point of sharp focus on the first layer, and B indicates the point of sharp focus on the second layer. These two S-curves occur when the drive voltage FEO applied to the focus actuator FEO decreases, i.e., an objective lens descends.

FIG. 4 is a flowchart showing operations of a conventional focus search mode. A detailed description of operations in each step follows. Once the focus search mode for a focus servo is activated, it is determined in step 4a whether to focus on the first layer or on the second layer. In case of focusing on the first layer, the process advances to the step 4b and sharply decreases the voltage (hereinafter referred to as FEO) applied to the focus actuator to bring the objective lens down to a sufficiently low position, as depicted FIG. 5A. In step 4c a slow increase of voltage FEO brings the objective lens up slowly. An S-curve appears in the focus error signal (FE) when the objective lens is raised to the focusing range. In step 4d, while the zero crossing point of an S-curve is monitored, if a signal of the zero crossing point of the S-curve changes from a high-state to a low-state, then in step 4e the focus servo is started to perform a focusing.

For focusing on the second layer, the process advances to step 4f, and then the voltage FEO sharply decreases to lower the objective lens sufficiently as shown in FIG. 5B. In step 4g the voltage FEO increases slowly to bring the objective lens up slowly. The focus error signal (FE) has the S-curve if the objective lens is raised to a focusing range. Here, signal FZC changes from a high-state to a low-state. The first point where signal FZC changes from a high-state to a low-state corresponds to a focus on the first layer so that voltage FEO continues to increase. The second point where signal FZC changes from a high-state to a low-state corresponds to a focus on the second layer. For this reason, if the second point is detected after steps 4h and 4i, then the process advances to step 4e to perform a focusing.

For example, in case, the DC sensitivity of the focus actuator is 1 mm/V, the focus search speed is 4 V/s, and the distance between the first layer and the second layer is 40 μm, then the speed of the focus actuator is computed by equation 1 below:

$$V_{fa}=(4 \text{ V/s}) \times (1 \text{ mm/V})=4 \text{ mm/s} \quad \text{(Equation 1)}$$

Since the distance between the first layer and the second layer is 40 μm, T, the time elapsed between the first zero crossing point and the second zero crossing point, is computed by equation 2:

$$T=40 \text{ μm}/(4 \text{ mm/s})=10 \text{ ms} \quad \text{(Equation 2)}$$

In addition, U.S. patent publication No. 5,303,225 entitled "Multi-layered Optical Disk with Track and Layer Identification" shows a multi-layered optical disk with a plurality of data storing layers that does not have a cross talk between nearby tracks and between nearby layers, and allows accurate positional determination in order to minimize the diameter of a light source and to enhance recording density. According to this disclosure, the multi-layered optical disk has a plurality of recording layers stacked together for reading and writing by focusing a light source on each track. These recording layers contain a recognition unit that stores the addresses of the recording layers. The focusing on the above disk is also made by the same method. That is, if a predetermined number of zero-crossing points are detected in S-curves, then focusing on the corresponding layer is performed.

In the above method, the focusing mechanisms for the first layer and the second layer are identical except for the determination of when to turn the focus servo on between the two points where the FZC signal changes to a low-state from a high-state. When focusing on the first and second layers is performed by the same method, then focusing on the first layer can be performed without major difficulty. However, to focus on the second layer, the search speed should be reduced to ensure reliability because there is the possibility that the focusing point will be lost due to an uncertainty relating to the time of turning on the focus servo at the second point among the two points where the FZC signal changes to a low-state from high-state.

SUMMARY OF THE INVENTION

Therefore, an object of the present invention is to provide a method and apparatus by which focusing on each layer of a multi-layered disk is performed having the same focusing speed and reliability as in a single-layered disk.

The present invention raises or lowers the objective lens according to the voltage applied to the focus actuator to detect the zero crossing point in an S-curve of the focus error signal. Focusing is achieved on the first or the second layer according to the above result. The method employed in the above step includes the steps of: rapidly decreasing a focus actuator voltage to bring down the objective lens first, slowly increasing the focus actuator voltage to bring the objective lens up, and turning on focus on the first layer according to the detection of the focus error signal; rapidly increasing the focus actuator voltage to bring up the objective lens, slowly decreasing the focus actuator voltage to lower the objective lens, turning on focus on the second layer according to the detection of the focus error signal.

DETAILED DESCRIPTION OF THE PREFERRED EMBODIMENT

The preferred embodiment of the present invention will be described in detail with reference to the attached figures. Please note that the same symbols are used for the same components in the various figures. Many specific details such as circuit components will be introduced to aid the overall understanding of the present invention, but it should be apparent to any one skilled in the art that without those specific details this invention can be carried out. Details and explanations of related techniques as well as the composition of the preferred embodiment will be omitted when such details detract from the understanding of the essence of the invention.

Figure 1:
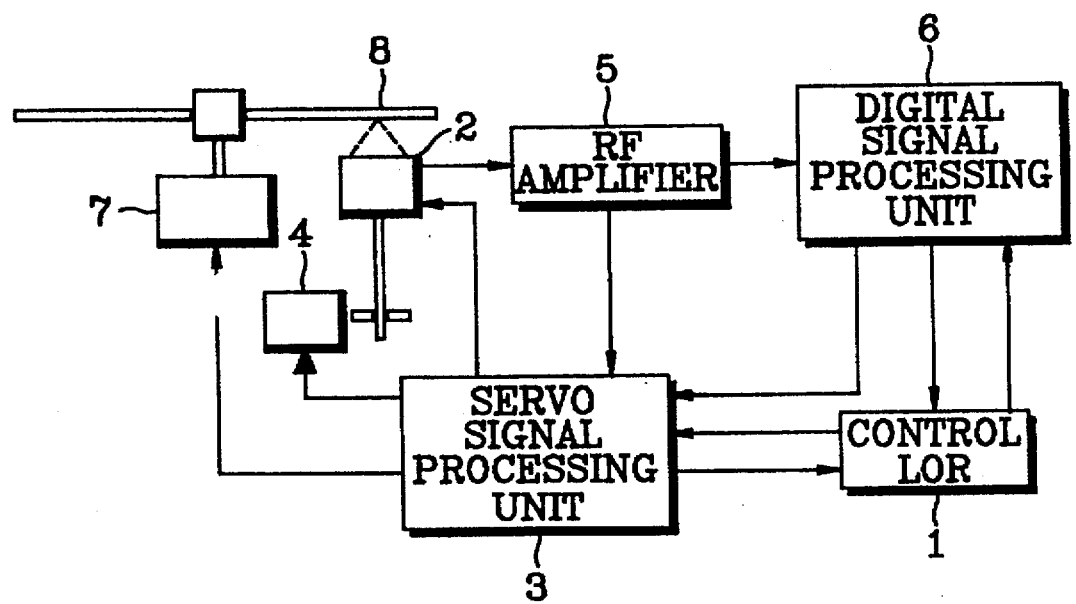
FIG. 1 is a block diagram of a data retrieving mechanism for a disk according to the present invention.
Figure 2:
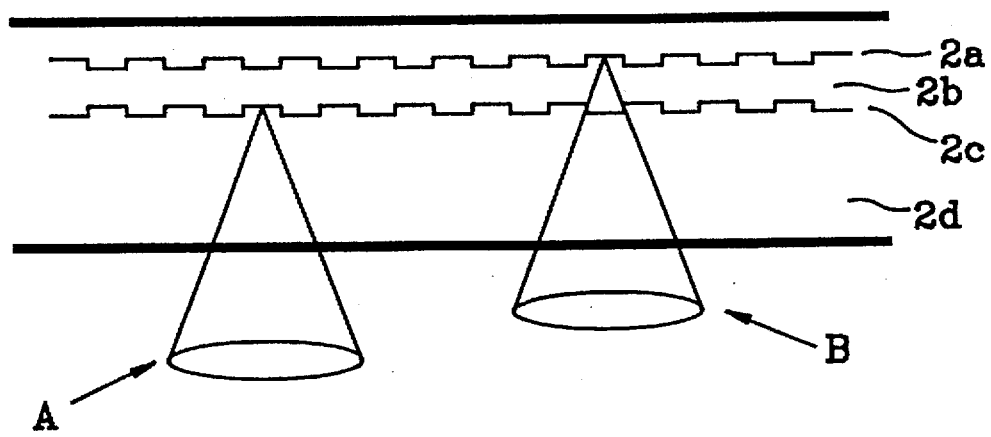
FIG. 2 illustrates the principle of focusing on a disk when the disk has double information layers.
Figure 3:
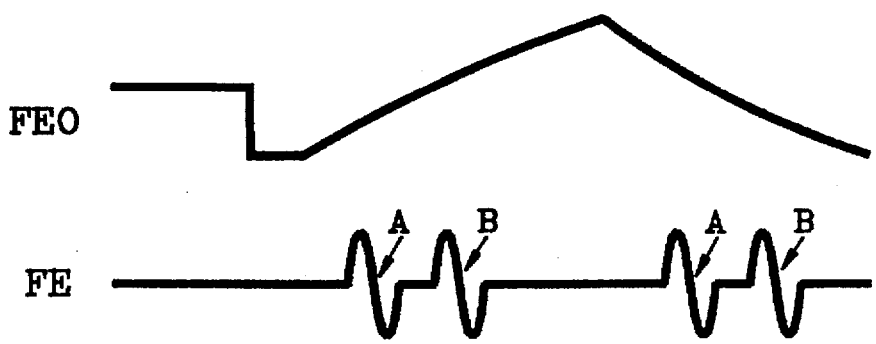
FIG. 3 shows a pattern of the focus error in a focus search.
Figure 4:
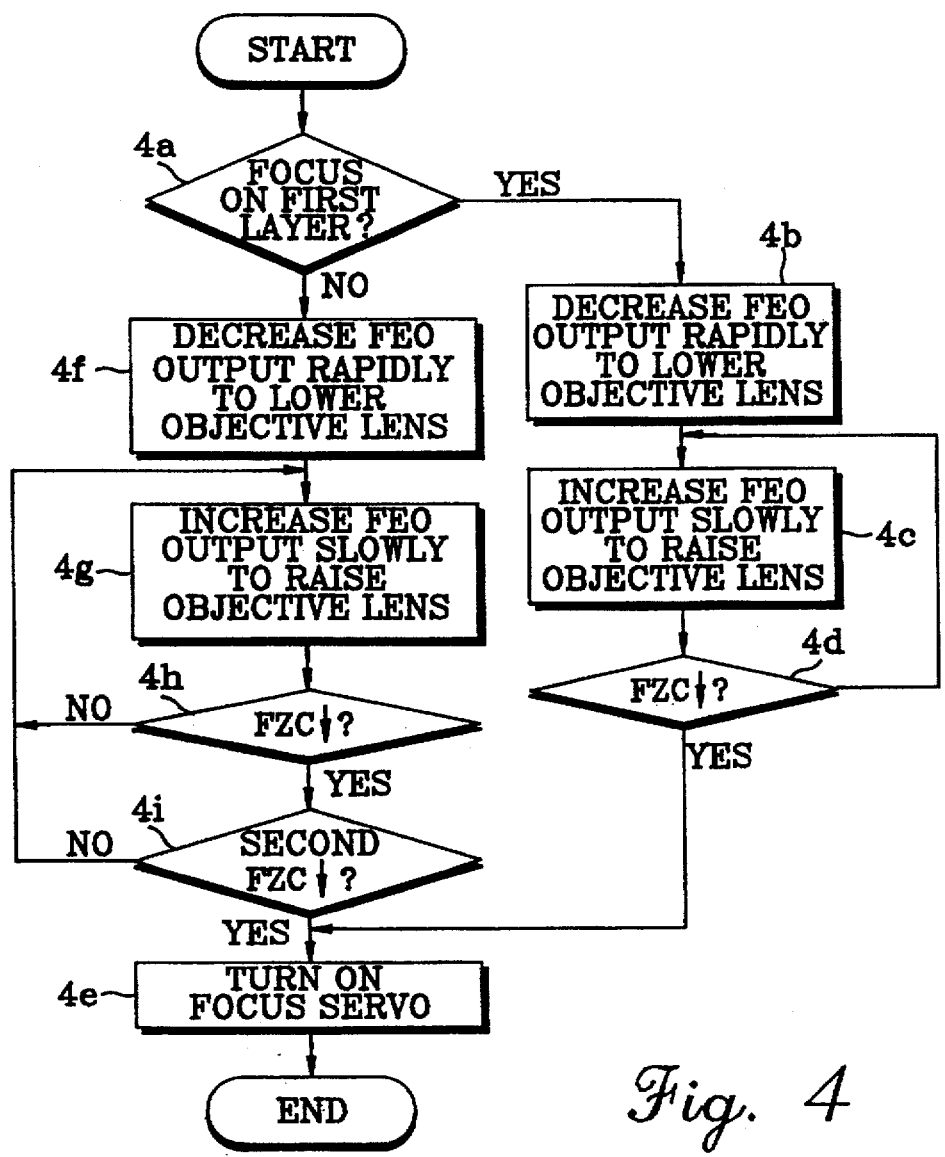
FIG. 4 is a flowchart showing a focusing process.
Figure 5A:
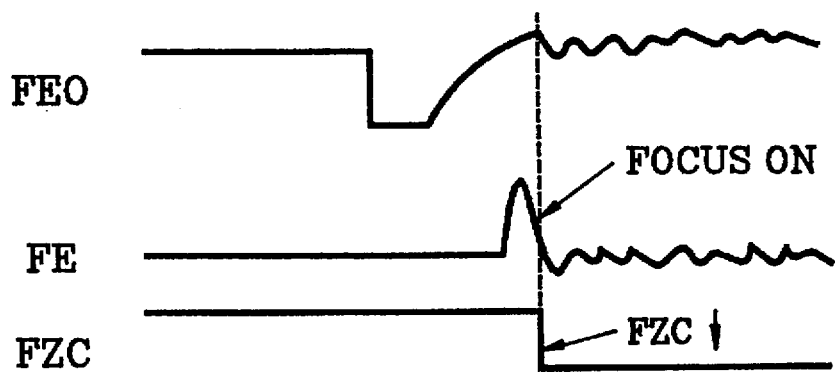
FIGS. 5A and 5B show focusing status according to the changes of the voltage applied to the conventional focus actuator.
Figure 5B:
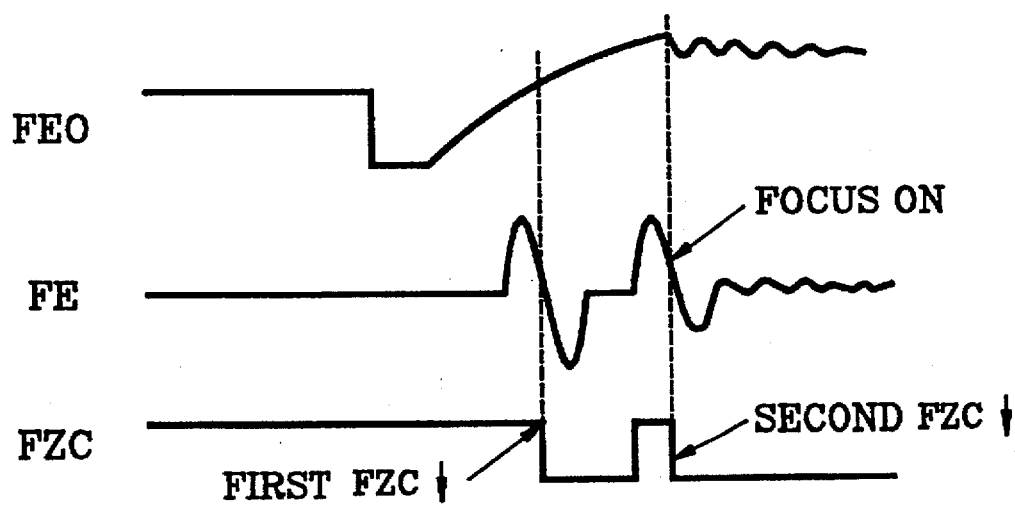
Figure 6:
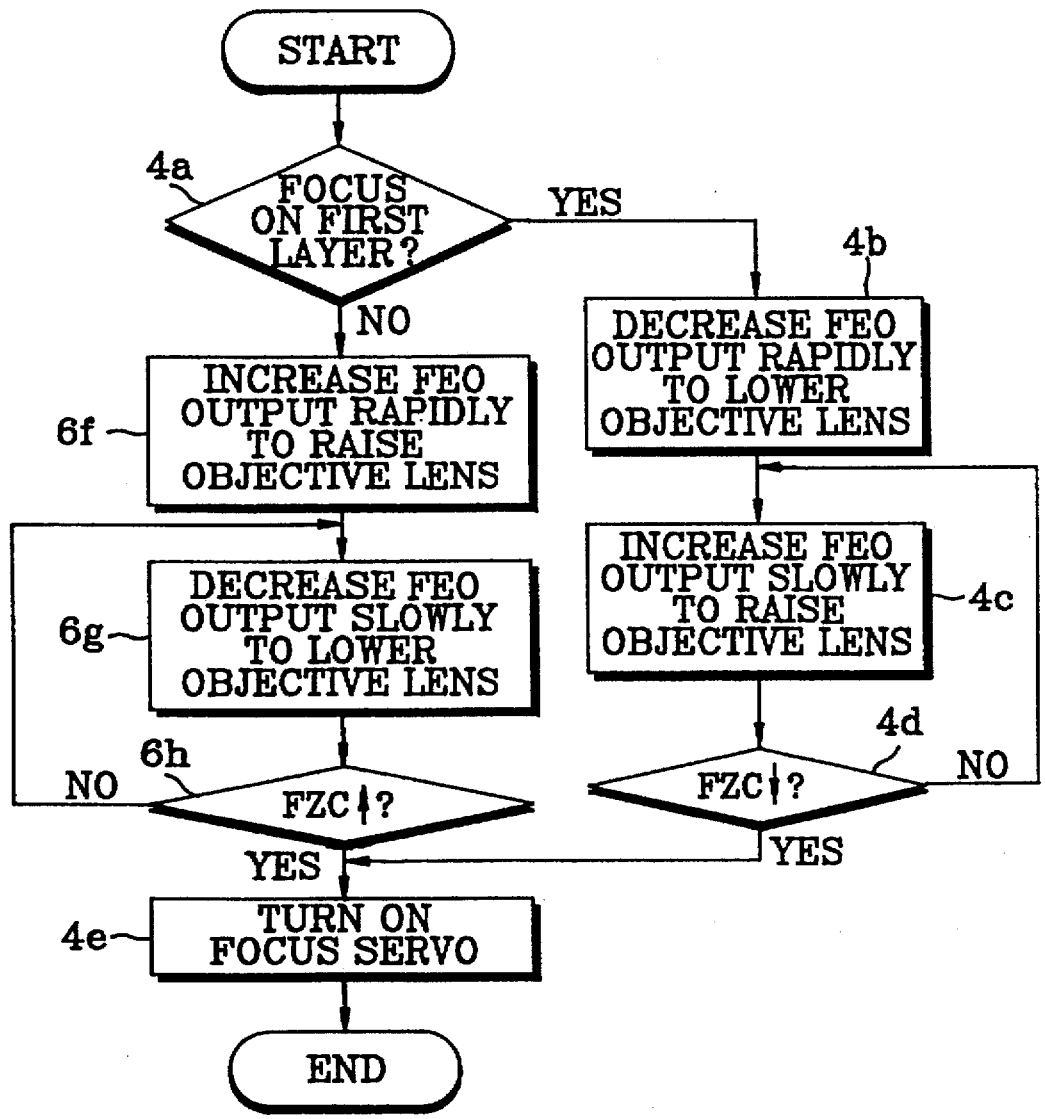
FIG. 6 is a flowchart showing a focusing process according to the present invention.

FIG. 6 shows a flowchart for a focusing process of the present invention and FIG. 7 shows focusing status according to the changes of the voltage applied to the focus actuator of the present invention. The focusing method of the present invention will be explained referring to these figures.

Figure 7A:
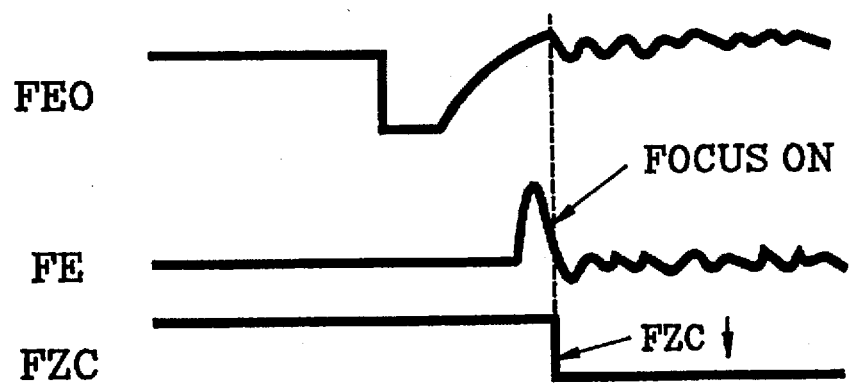
FIGS. 7A and 7B show the focusing status according to the voltage changes applied to the focus actuator of the present invention.

First, the determination of whether a layer to be focused on is the first layer or the second layer is performed in order to set the focus servo. For focusing on the first layer, a rapid decrease of the voltage FEO brings the objective lens down sufficiently low in the step 4b as depicted in FIG. 7A. Slowly increasing the voltage FEO applied to the focus actuator brings the objective lens up slowly in the step 4c. An S-curve appears in the focus error signal when the objective lens is raised to within a focusing range. If signal FZC, which monitors the zero-crossing point, changes to a low-state from a high-state in the step 4d, then the process advances to step 4e to perform a focusing operation.

Figure 7B:
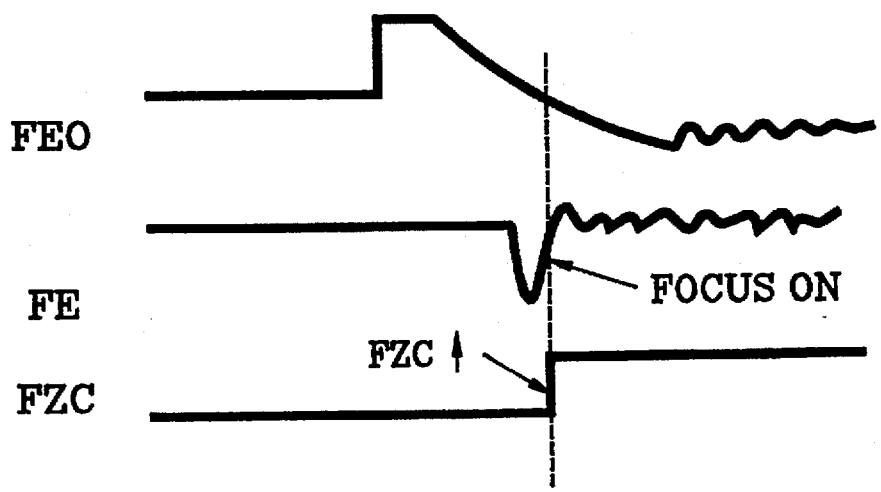

For focusing on the second layer, a rapid increase of the voltage FEO brings the objective lens up sufficiently high in the step 6f as depicted in FIG. 7B. A slow decrease of the voltage FEO applied to the focus actuator brings the objective lens down slowly in the step 6g. The S-curve appears in the focus error signal if the objective lens is raised to the focusing range. If signal FZC, which monitors the zero-crossing point, changes to a high-state from a low-state, then the process advances to step 4e to perform a focusing operation.

The present invention described so far has an advantage over other technologies in that it can access the first layer and the second layer with the same search speed and reliability because the focus is made when the S-curve of the focus error signal corresponds to the first zero-crossing point.

In addition, it should be understood that the present invention is not limited to the specific embodiments described in this specification except as defined in the appended claims.

What is claimed is:

1. A method for focusing on a first layer or a second layer of a multi-layered disk according to the result of a detection of zero-crossing points of an S-curve focusing error signal by raising or lowering an objective lens through a change in a focus actuator voltage, said method comprising the steps of:

determining whether a focusing operation is to be performed on the first layer or on said second layer;

if it is determined in said determining step to perform a focusing on said first layer, rapidly decreasing said focus actuator voltage in order to lower said objective lens, and then slowly increasing said focus actuator voltage to bring said objective lens up slowly, and detecting the zero-crossing points of said focus actuator voltage to thereby focus on said first layer; and if it is determined in said determining step to perform a focusing on said second layer, rapidly increasing said focus actuator voltage to raise said objective lens, and then slowly decreasing said focus actuator voltage to lower said objective lens slowly again, and detecting the zero-crossing points of said focus actuator voltage to thereby focus on said second layer.

2. A data retrieving apparatus for use in conjunction with a multi-layered disk comprising:

an objective lens for focusing on a reflective layer of said disk;

means for selecting one of a first layer and a second layer to be focused on;

means for moving said objective lens up and down means for driving said objective lens by generating a driving voltage, wherein for a focusing operation on said first layer, said driving voltage increases rapidly to raise said objective lens, and decreases slowly to lower said objective lens, and for a focusing operation on said second layer, increases rapidly to raise said objective lens, and decreases slowly to lower said objective lens;

means for generating a focus error signal having a zero-crossing point by forming an S-curve according to a focusing status of said disk;

means for generating a monitoring signal forming an edge component of said zero-crossing point by monitoring said focus error signal; and means for detecting said edge component of said monitoring signal and making said focusing means focus on said selected layer of said disk.

3. A disk focusing apparatus as in claim 2, wherein said disk is made in a double layer of a semi-transparent information layer and an opaque information layer.

4. A disk focusing apparatus as in claim 2, wherein said disk is made in a double layer of a semi-transparent information layer and an opaque information layer.

5. A disk focusing apparatus as in claim 2, wherein said disk is made in a double layer of a semi-transparent information layer and an opaque information layer.

* * * * *